United States Patent [19]

Shapiro

[11] 4,264,905
[45] Apr. 28, 1981

[54] DRIVE BELT MOVEMENT DETECTING SYSTEM

[75] Inventor: Sumner Shapiro, Delmar, N.Y.

[73] Assignee: Dayco Corporation, Dayton, Ohio

[21] Appl. No.: 930,297

[22] Filed: Jul. 31, 1978

[51] Int. Cl.³ .................. B65G 43/00; G01P 3/36; H02P 5/46
[52] U.S. Cl. .................. 340/679; 198/856; 307/120; 310/152; 318/72; 324/168; 324/174; 324/175; 328/74
[58] Field of Search .............. 340/679, 676, 681, 671; 324/161, 168, 173, 174, 175; 226/100; 198/855, 856; 310/68 B, 152; 307/106, 118, 120; 328/72, 74; 318/69, 70, 6, 7, 72

[56] References Cited

U.S. PATENT DOCUMENTS

| | | | |
|---|---|---|---|
| 2,363,336 | 11/1944 | Keeler | 310/152 X |
| 2,429,500 | 10/1947 | Wolfner | 328/74 X |
| 2,529,161 | 11/1950 | Kelling et al. | 328/74 X |
| 2,932,382 | 4/1960 | James | 340/676 X |
| 3,031,118 | 4/1962 | Frommer | 328/74 X |
| 3,273,001 | 9/1966 | Baermann | 324/174 X |
| 3,365,615 | 1/1968 | Bart | 307/120 X |
| 3,686,507 | 8/1972 | Krutz et al. | 324/168 X |
| 3,755,687 | 8/1973 | Garnett | 307/106 X |
| 3,831,161 | 8/1974 | Enabwit | 73/146.5 X |
| 3,846,701 | 11/1974 | Sampey | 324/175 |
| 4,020,945 | 5/1977 | Takeno et al. | 198/856 X |
| 4,088,036 | 5/1978 | Hillman | 324/175 X |
| 4,095,146 | 6/1978 | Spaman et al. | 318/72 |

Primary Examiner—John W. Caldwell, Sr.
Assistant Examiner—Joseph E. Nowicki
Attorney, Agent, or Firm—Charles E. Bricker

[57] ABSTRACT

A belt movement sensor detects the movement of a belt having signal generating means embedded in or emplaced on the surface of a drive belt, and actuates a warning signal and/or controls the drive motor when the signal from the sensor varies by more than a predetermined amount from a set point.

8 Claims, 3 Drawing Figures

DRIVE BELT MOVEMENT DETECTING SYSTEM

BACKGROUND OF THE INVENTION

The present invention relates to a system for detecting movement of a belt in an associated drive system.

In the past a variety of devices have been used to detect belt slippage or belt failure in a drive system. As an example, forced air heating/cooling systems generally employ an air flow switch in the return duct to detect whether or not air is moving through the system. One problem with such an arrangement is that the air flow switch sensing vane can become coated with airborne dirt, rendering it inoperative. As another example, pressure sensing switches are used in liquid pumping systems to detect whether or not the system is operating. Should such pressure switch fail hydrostatically, the liquid can enter the electrical portion of the switch, rendering it inoperative. What is desired is a means for detecting slippage or failure of a drive belt in a belt drive system.

U.S. Pat. No. 3,877,003, issued Apr. 8, 1975 to Kawashima describes a warning system for belt slippage wherein the rotational speed of a driven member is compared with the rotational speed of a driving member, and a warning is given when the output signal of the comparing means reaches a pre-determined value in a driving system wherein the driving speed is not constant, as in an automobile engine. However, a simpler detecting arrangement is desired for a system wherein the driving speed is constant.

Accordingly, it is an object of the present invention to provide a system for detecting movement of a belt in a belt drive system.

Other objects, aspects, and advantages of the present invention will become apparent to those skilled in the art from a reading of the following detailed description of the invention, the attached drawing and the appended claims.

SUMMARY OF THE INVENTION

In accordance with the present invention there is provided a belt movement detector comprising, in combination, an endless power transmission belt having signal generating means in its outside surface, and detecting means mounted adjacent to the belt.

Also provided in accordance with this invention is a method for determining the movement of a belt in a power transmission system.

DETAILED DESCRIPTION OF THE INVENTION

Figure 1:
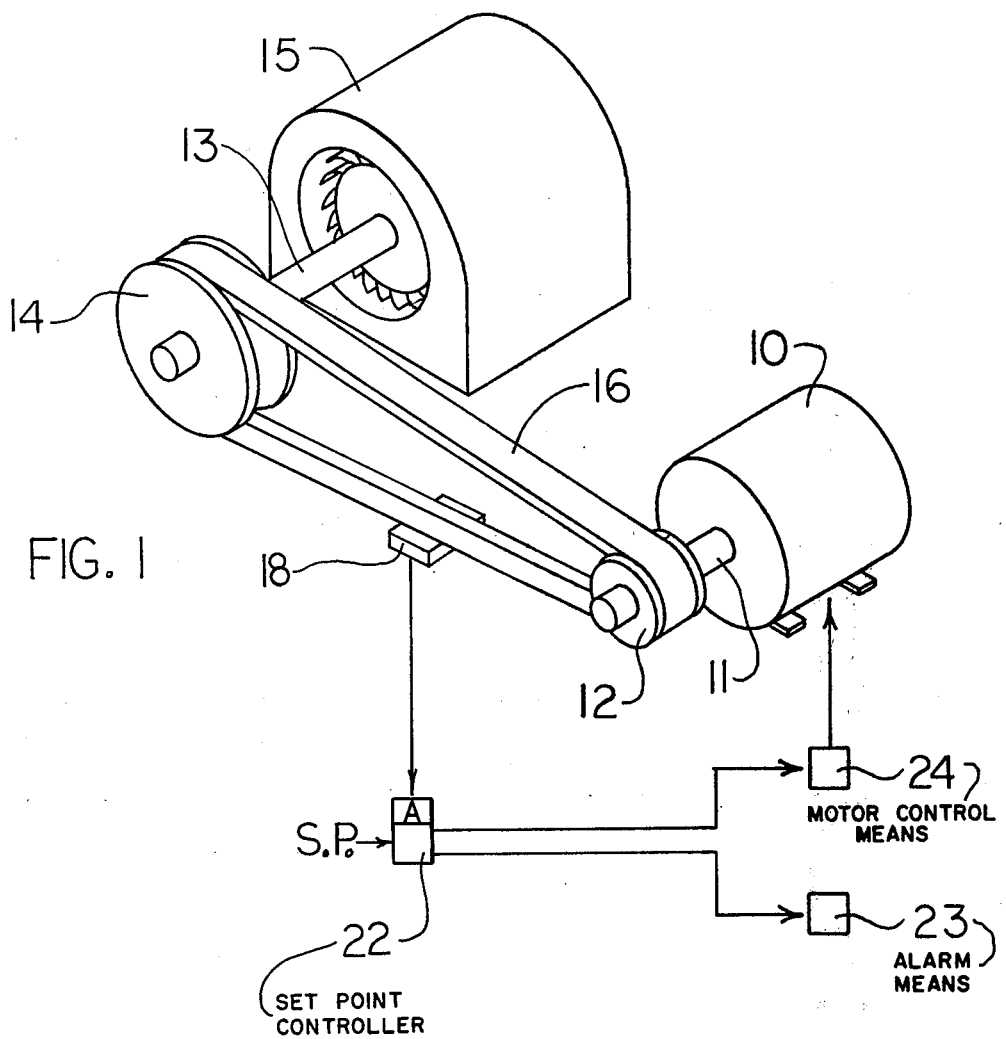
FIG. 1 is a perspective view, partly diagrammatic, showing a control/alarm system which employs the present invention.
Figure 2:
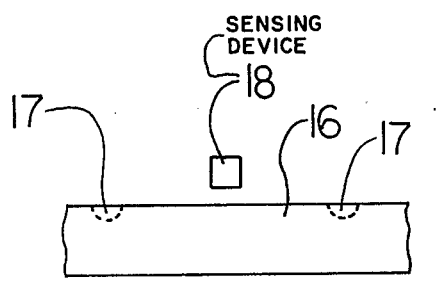
FIG. 2 is a side view of a power transmission belt having signal generating means embedded in the top portion thereof.

Referring now to the drawing, FIG. 1 shows an exemplary embodiment of the present invention comprising a motor 10 having a shaft 11 with a driving pulley 12 positioned thereon, a driven shaft 13 having a driven pulley 14 positioned at one end thereof and a working element 15, shown here as a fan, positioned at its other end, and an endless power transmission 16 entrained around with one embodiment of the invention and as shown in FIGS. 1 and 2, at least one magnet 17 is embedded in an outer surface of the belt 16. A sensing device 18, such as, for example, a magnetic proximity switch (commonly referred to as a "reed switch"), or a split-coil electric field sensor, is positioned near, but not touching the belt 16, preferably in the flat span between the pulleys 12 and 14.

Figure 3:
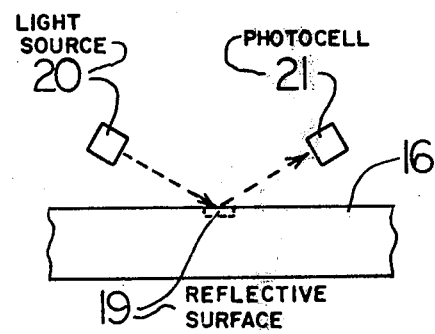
FIG. 3 is a side view of another embodiment of the invention showing a photo electric reflective surface emplaced on the outer surface of a power transmission belt, together with a light source and a light receptor.

In another embodiment and as shown in FIGS. 1 and 3, a reflective surface 19 is embedded in or emplaced on an outer surface of the belt 16. The sensing device 18, in this embodiment, comprises a light source 20 and a light sensitive cell 21.

The output from the sensing device 18 is passed to a set point controller 22, which comprises an optional amplifier A which may be used as necessary to increase the strength of the output signal from the sensing device 18 to a predetermined level.

In the set point controller 22 the signal output from the sensing device 18 is compared to a set point S.P. For simplicity of illustration, only one set point is shown in the drawing. It will be recognized by those skilled in the art that more than one set point can be set into the controller 22 depending upon the type of operation desired. For example, in normal operation, the set point S.P. might be set equal to the output signal from the sensing device 18. Should the belt fail or slip, the output signal from the sensing device 18 would be lower than the set point S.P. The controller 22 could then activate an alarm means 23 and/or provide a control signal to motor control means 24 to increase the speed of motor 10.

The belt 16 can be made by any method known in the art. The magnet 17, shown in FIG. 2, can be embedded in the belt 16 prior to curing the belt. The reflective surface 19, shown in FIG. 3 can be incorporated into the belt surface either before or after curing the belt 16.

It is presently preferred that the signal generating means be located such that it will not contact any surface of the driving or driven pulleys. Thus, in a V-type belt the signal generating means should be located in or on the top or bottom surface. In a V-ribbed type belt, the signal generating means should be located in or on the outer surface of the belt.

The method of the present invention comprises the steps of providing the belt 16 with a signal generating means, such as embedded magnet 17 or reflective surface 19, providing a signal sensing means, such as sensing device 18 or light source 20 and light sensitive cell 21, in close proximity to the belt 16, and employing the signal output from the signal sensing means 18 or 20/21 to provide indication of movement of the belt 16.

Various modifications and embodiments of the invention will be apparent to those skilled in the art in view of this disclosure.

I claim:

1. In combination, a working element having a driven pulley attached thereto, a driving motor having a driving pulley attached thereto, an endless power transmission belt entrained around said driving and said driven pulleys for transmitting power from said motor to said working element, and means for detecting the transmission of power from said motor to said working element, said means comprising signal generating means in at least one outside surface of said belt, sensing means mounted adjacent to said belt for detecting the passage of said signal generating means past said sensing means and adapted to provide a first signal for each passage of said signal generating means past said sensing means, signal receiving and control means in communication with said sensing means adapted to receive a first signal from said sensing means and compare said signal to a set point and adapted to provide a second signal when said first signal differs from said set point by a predetermined amount, and motor controlling means adapted to receive said second signal and to control the speed of said motor in proportion to said second signal.

2. The combination of claim 1 wherein said signal generating means comprises at least one magnet embedded in said belt.

3. The combination of claim 2 wherein said sensing means comprises a reed switch.

4. The combination of claim 2 wherein said sensing means comprises a split coil.

5. The combination of claim 1 wherein said signal generating means comprises a reflecting surface on an outer surface of said belt and said sensing means comprises a light source and a light sensitive cell.

6. The combination of claim 1 further comprising an alarm means adapted to receive said second signal to activate an alarm when said second signal is received.

7. A method for controlling the motor speed in a power transmission system comprising a motor means having a driving pulley operatively associated therewith, a working element having a driven pulley operatively associated therewith, and an endless power transmission belt entrained around said pulleys; which comprises the steps of providing signal generating means in said belt, providing signal sensing means in close proximity to said belt having said signal generating means, passing the signal output from said sensing means to a set point controller and comparing said signal output therein to a set point, and when the difference between said signal from said sensing means and said set point exceeds a predetermined amount, providing a signal from said set point controller to a motor controlling means to control the speed of said motor in proportion to said signal from said set point controller.

8. The method of claim 7 wherein when the difference between said signal from said sensing means and said set point exceeds a predetermined amount, said set point controller provides a signal to an alarm means, activating said alarm means.

* * * * *